June 7, 1960 H. E. DYKEMAN 2,939,570
SHIP UNLOADING APPARATUS
Filed July 24, 1956
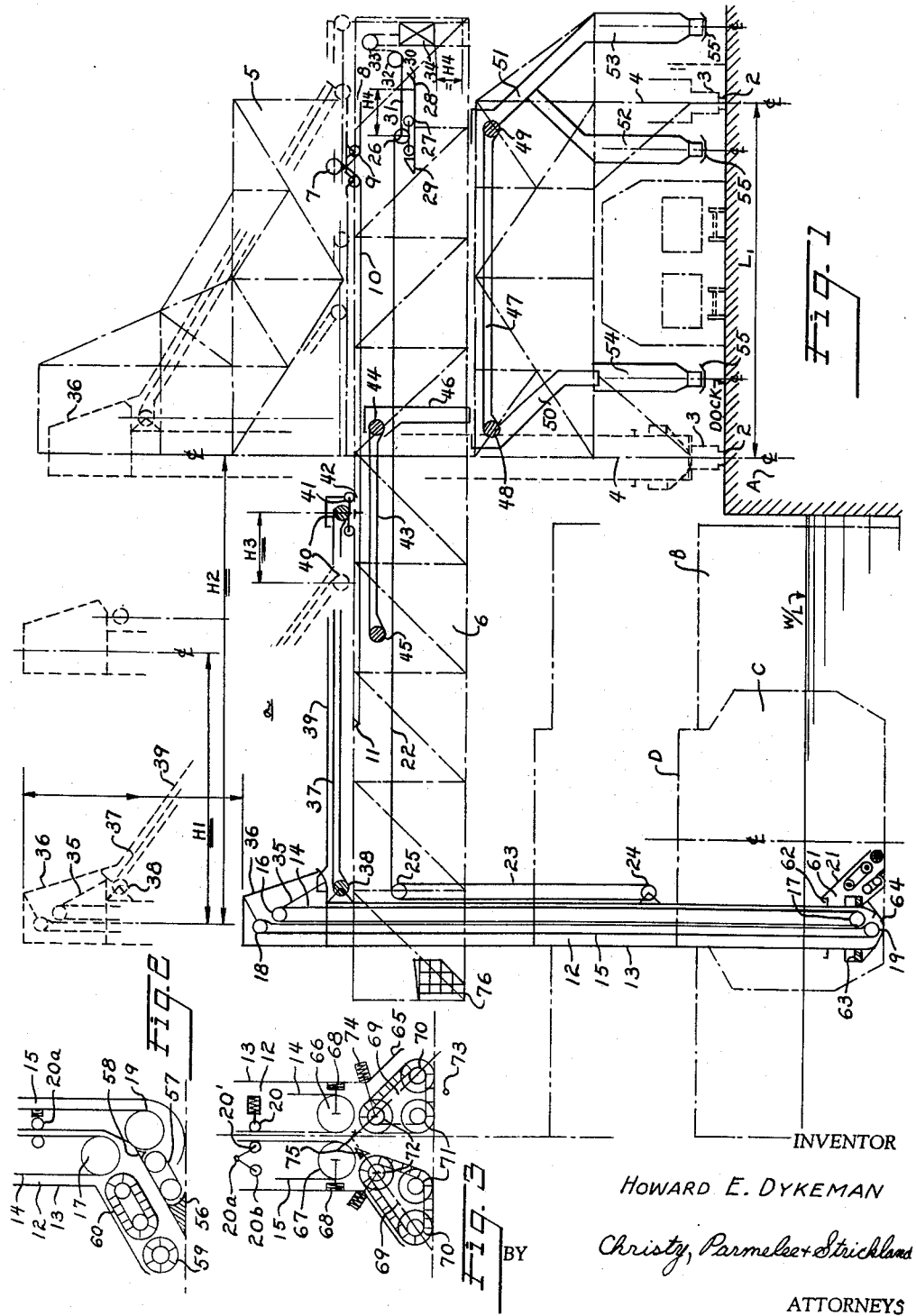
INVENTOR
HOWARD E. DYKEMAN
BY Christy, Parmelee + Strickland
ATTORNEYS

United States Patent Office 2,939,570
Patented June 7, 1960

2,939,570

SHIP UNLOADING APPARATUS

Howard E. Dykeman, Pittsburgh, Pa., assignor to Dravo Corporation, Pittsburgh, Pa., a corporation of Pennsylvania Filed July 24, 1956, Ser. No. 599,799

2 Claims. (Cl. 198—89)

This invention relates to material handling and is for an apparatus especially useful for unloading bulk material from the hold of a ship, but is not confined to that purpose. It is especially designed for the unloading of rock-like materials, particularly iron ore, which is extensively transported in marine vessels and which in most cases is a hard, rock-like material as distinguished from the finely divided ores of the Great Lakes region.

Unloaders heretofore designed for this purpose have generally used a clam shell bucket which is lowered into the hold of the ship, closed to gather a load of material, raised, and then carried horizontally to a position over the dock where the bucket is opened and the ore discharged onto a receiving hopper from which it may in turn be discharged onto conveyor belts running along the dock or directly into freight cars. The bucket is suspended from and moves along a boom which is extended from one side of a gantry or movable tower mounted on trucks which travel on rails extending along the dock so that it can be moved from one position to another.

The maximum rated capacity for equipment of this kind is of the order of 2,000 gross tons per hour, whereas there is need for equipment capable of handling the material at a much higher rate, i.e., at the rate for example of 6,000 tons per hour. Where a bucket hoist is used the operation is essentially an intermittent operation in that from the time the bucket leaves the hold of the ship until it moves to the discharge position, dumps and re-enters the hold, no material is being taken out of the ship. There are practical limits on the size of the buckets since they must be lowered through hatches on the deck of the ship, and the speed of operation is also limited. In large unloading installations a complete unloading cycle will typically require from 40 seconds to a minute. Thus it will be seen that the bucket hoists have approached the maximum capacity for present designs of boats.

In the unloading of grain and coal, a vertical conveyor at the outer end of a boom is provided, and by raising and lowering the boom the vertical conveyor can be lowered into the hold of the ship and raised out of the hold. Such a vertical conveyor is often referred to as a "marine leg," and a usual bucket type of conveyor may be used because the grain and the coal, which is largely composed of fines or small, easily handled lumps, will effectively fill the buckets on the conveyor and give a fairly high capacity. Ore, on the other hand, ranges commonly from lumps five inches in diameter for Venezuelan ore to lumps twelve inches in diameter for other ores. As indicated above, it is hard material, highly abrasive, and the amount that can be handled in a bucket conveyor at practical speeds is relatively limited.

The object of the present invention is to provide an unloader of unique design useful for the unloading of ore, but applicable to the unloading of other bulk materials, which may be lowered into the hold of a ship, and remove the material continuously and at a rate substantially greater than can be attained with equipment presently available.

A further object of my invention is to provide a new unloader organized to give great flexibility in the handling of large quantities of material.

A further object of the present invention is to provide an unloader with a marine leg having material conveying means capable of handling large volumes of material, and also to provide an unloader having a marine leg with digging means at the bottom of the leg capable of digging from the surface down into the hard, compacted ore material in the hold of the ship, breaking up agglomerations of such material to its original lump size, and feeding the material to the conveying means.

A further important object of my invention is to provide in an unloader a marine leg which is vertically adjustable at the end of a fixed boom. A still further important object is to provide a floating arrangement for the boom by which it is counter-weighted so as to maintain the marine leg at the proper operating position and avoid likelihood of the leg being lowered through the hull plates of the ship and punching a hole through the bottom.

These and other objects and advantages are attained by my invention. The apparatus shown in the accompanying drawing has been designed to handle ore at the rate of 6660 net tons per hour, or 222,000 pounds per minute, so as to make possible the unloading of 30,000 tons of ore from an ocean-going ore-carrying vessel in a period of around six hours, including the time required for maneuvering the apparatus from one hatch to another. The large investment represented by such vessels requires that the turn around time in port be kept at a minimum.

The above figures are mentioned only by way of illustrating the advantages of the invention in substantially increasing the rate of material handling, and as indicating something of the mass and size of the parts involved.

Generally my invention contemplates the provision of a structural tower or gantry mounted on wheeled trucks for movement along the tracks now provided on unloading docks. This tower has a horizontally movable trolley truss at the outer end of which is a marine leg. The truss may be moved back and forth to bring the marine leg alongside the tower or to project the leg out over the hatch of a ship moored alongside the dock. The marine leg is movable vertically from a position where it would clear any of the usual objects that might be protruding from the deck of an ore-carrying ship to a position where it will reach to the bottom of the hold of a ship, the range of vertical movement in the structure with respect to which I have reference being of the order of 40 feet.

The marine leg includes a vertical conveyor in the form of two belts having opposed faces that are moving upwardly. Material is pushed by gathering means into the bight between the two belts at the lower end of the marine leg and the material is confined between these belts until it reaches the top of the marine leg. A digging means is provided at the lower end of the marine leg for digging or ripping into the material in the hold and carrying the material to the bight of the conveyor rolls.

At the top of the marine leg there is a discharge apron from which the material is delivered to a conveyor having one end pivotally connected with the top of the leg, and having its other end connected with a receiving hopper slidable along the trolley truss. This hopper in turn delivers the material to a conveyor mounted on the truss, and from this conveyor the material may be discharged through a discharge chute onto a conveyor mounted on the tower and thence into one or more discharge spouts and directed onto conveyors running along the dock.

Although the apparatus could deliver material directly to freight cars, the high rate of operation would be impaired by maneuvering the cars, so that it is more practical for the conveyors to carry the material to a storage pile and then loaded into cars. Fall or similar rigging are provided for raising and lowering the marine leg, and the operating cable extends along the truss and is wound upon an power-driven drum carried on a carriage movable along the trolley truss. A second cable attached to the carriage passes over a guide sheave or guide sheaves on the trolley truss, and a counterweight is hung from this cable while a control system will keep the first cable always under tension to prevent the full weight of the marine leg from ever being supported on the boat plates.

My invention may now be more fully described in connection with the accompanying drawings, in which:

Fig. 1 is a schematic side elevation of the unloading apparatus embodying my invention;

Fig. 2 is a fragmentary schematic detail view showing a modified form of digger on the lower end of the marine leg; and Fig. 3 is a view similar to Fig. 2 showing schematically another form of digger.

Referring to the drawings, A designates a dock and B represents schematically the outline of a marine ore carrying ship alongside the dock, this ore carrier having a cargo hold C which is divided lengthwise of the ship by transverse bulkheads into a number of compartments, and access to each compartment is afforded through a hatch D at the top of each compartment. Although it is not material to the present invention, it may be explained that the cargo hold was a width much less than the full beam of the ship so as to provide for a large water ballast space around the cargo whereby water can be pumped in to the vessel as ore is removed to avoid stresses in the hull which might otherwise destroy the vessel. It is to be noted that the hatch D is of less width than the cargo compartment C so that the deck at each side overhangs the compartment.

Extending along the dock A are rails 2 on which ride trucks 3 at the base of a tower or gantry having legs 4, the gantry straddling the span between the rails. The trucks 3 are only schematically shown, being of the type generally employed in apparatus of this kind, and the steel structure itself for the tower or gantry is made up of structural sections, the particular design of which follows usual engineering practice and is therefore only outlined by dot-and-dash lines. The entire tower or gantry is designated generally as 5. The gantry supports a transversely-movable trolley truss 6 which moves on roller guides in the gantry frame, these guides not being shown because of the small scale of the drawing, but being of a type known in the art and arranged to guide the truss 6 for endwise back and forth movement. The truss is operated by a reversible power-driven drum 7 supported in the tower. A cable passing around this drum has one end anchored at 8 to the truss near the right-hand end, this cable passing under a deflecting sheave 9 and around the drum. The other reach of the cable, designated 10, is anchored to the truss at 11 at a point to the left of the middle of the truss as shown in Fig. 1. The arrangement is such that the trolley truss has an overall horizontal travel which may be effected through the operation of the drum 7 from a retracted position where the left-hand end of the truss is close to the tower, to the extended position in which it is shown where it projects beyond the hatch opening D at the side most remote from the dock. In the particular apparatus here shown on the scale to which it is drawn, this represents an overall travel slightly in excess of 85 feet.

Carried on the outer end of the truss 6 is a marine leg designated generally as 12. It comprises a supporting cage or structure 13 within which are two vertically-extending belts designated 14 and 15. The belt 14 is a relatively stiff, heavy fabric belt passing around a pulley 16 at the top, and a pulley 17 at the bottom. The belt 15 is preferably a lighter belt which is more flexible and yieldable, and which may be formed on conventional rubber and fabric. It passes around a pulley 18 at the top and 19 at the bottom. It will be seen that the pulley 18 is disposed in slightly overlapping relation to the pulley 16, and the pulley 17 is disposed in slightly overlapping relation to the pulley 19 so that the inner flight of the belt 15 is deflected, and the confronting faces of the two belts maintained in normally close or contacting relation.

A power drive (not shown) drives the two belts at the same linear speed and the confronting faces of the two belts move upwardly. At intervals along the inner face of the belt 15 there are spring-pressed rollers which are not shown in Fig. 1, because of the small scale of the drawing, and for purposes of clarity, but which are schematically shown in Fig. 3, and which are designated generally as 20. Their purpose is to apply a yieldable pressure urging the surface of one belt toward the other. Guide rollers are also preferably provided against the inner surface of the upwardly-traveling flight of the belt 14. These rollers are not shown in Fig. 1, but in Fig. 3 the rollers are designated 20', and they are carried on arms pivoted in the cage of the marine leg at 20a. Another arm of this lever has a counterweight 20b so that the roller 20' is yieldably urged against the inner face of the belt.

At the lower end of the marine leg there is a digger or gathering device designated generally as 21. It may be relatively fixed with reference to the bottom of the marine leg, or it may be mounted for movement thereon. In the particular embodiment shown in Fig. 1, the entire unit 21 is designed to swivel around the vertical axis of the leg, but in Figs. 2 and 3 the gathering device has no such swiveling action. The construction of the digger 21 or the modification shown in Figs. 2 and 3 will be hereinafter described in detail.

In use the marine leg must be moved up and down so as to be entered into the hold of the ship through the hatchways and to lower as the contents of the hold are removed, and it must also be raised to clear the deck of the ship when it is moving from one hatch to another, and must accommodate for the rise or fall of the ship due to the lightening of the load or the change of tide. To this end it passes through a vertical guideway in the outer end of the trolley truss 6. Up and down movement of the marine leg is effected through a cable 22 which is reeved through a fall designated generally as 23, and having a block 24 attached to the marine leg and a block 25 attached to the truss. Actually a series of these falls are provided, but for the purposes of this description only a single one is shown. One end of the cable 22 is of course attached to the marine leg at the block 24 while the other end of the cable passes around a reversible hoist drum 26.

This drum is mounted on a carriage 27 movable along a trackway 28 on the trolley truss, this carriage having a limited movement between a forward abutment 29 and the rear end of the track 30. A cable 31 is attached to this carriage and passes around guide sheaves 32 and 33. A counterweight 34 is hung from the end of the cable 31 so as to exert a constant tension urging the carriage 27 to the right as viewed in Fig. 1. The counterweight 34 is of the order of the weight of the marine legs, but is somewhat less. If the marine leg is of the order of 150 to 175 tons, the counterweight would preferably be approximately 5 tons, or 10,000 pounds less. Consequently while it will exert tension on the carriage 27, it will never exert sufficient pull of itself to raise the marine leg.

Under normal operating conditions the carriage 27 is against the abutment 29, and when the drum 26 is operated the marine leg may be raised or lowered. However if the marine leg should bottom either on the material in the hold or against the bottom of the hold, tending to develop slack in the cable 22, the counterweight will move the carriage 27 to the right as viewed in Fig. 1, taking up this slack, and absorbing most of the weight of the marine leg. The drum 26 may then be rotated to take up the slack and draw the carriage back to the normal position against the abutment 29. If desired, this operation may be effected automatically through the use of limit switches operated by the counterweight 34, which, however, is not shown, and which involves only the use of well-known circuits.

By this arrangement the marine leg is counterbalanced by the weight whenever slack develops in the cable, but the counterweight has but little vertical range of movement.

At the top of the marine leg extending downwardly from the roller 16 is a discharge apron 35 with an enclosing hood 36. This discharges onto a belt conveyor 37 which is pivotally connected at 38 to the upper end of the marine leg, this conveyor having a cover 39. The opposite end of the conveyor 37 passes around a pulley 40 which is carried on a trolley 41 movable along the top of the truss 6. This trolley also carries an enclosure 42 that directs the material onto a short conveyor belt 43 mounted on rollers 44 and 45 also carried on the trolley truss. The conveyor 43 discharges into a vertical chute 46 which is carried on the trolley truss, and which terminates above the horizontal transverse conveyor belt 47 mounted on the tower and fixed relatively to the trolley truss.

In the full line position shown in Fig. 1 the marine leg is in its lowermost position and the conveyor 37 is substantially horizontal. As the end of the marine leg is elevated the outer end of the conveyor 37 is raised. This pulls the trolley 41 to the left as viewed in Fig. 1, keeping the discharge chute 42 over the belt conveyor 43. The conveyor 43 is of sufficient length to receive material from the belt 37 in any position of the trolley in its normal range of movement from the full-line position in Fig. 1 to the dotted line position in Fig. 1. This range is more than the operating depth of the ship hold. When the marine leg is raised entirely clear to the vessel the conveyor 37 may move almost to a vertical position, but at this time no material is being gathered or transported so that, although the carriage 41 is then no longer over the belt 43, no material is lost.

As the marine leg moves crosswise of the ship from the full-line position shown in Fig. 1 toward the dock, the carriage 41, conveyor 43, and discharge chute 46 all move with it, and their relative positions do not change. However the discharge chute 46 travels along the belt 47 so as to discharge material onto the belt in the full range of the horizontal movement of the trolley truss in its unloading position.

The conveyor 47 is a reversible conveyor and may discharge from either end over its pulleys 48 and 49. From each of the pulleys 48 and 49 there are discharge chutes 50 and 51 respectively, and material flowing down the chute 51 may be deflected into either one of two loading hoppers 52 or 53, while material passing down the chute 50 discharges into a loading hopper 54. These loading hoppers are located over conveyor belts 55 extending along the dock parallel with the rails 2.

The chutes 50 and 51 and the loading hoppers 52, 53 and 54 are all carried on the traveling tower or gantry. The loading hoppers provide capacity to store material when the rate of unloading is high, and discharge the accumulation when the rate slackens to keep the load of the belts 55 more uniform.

By reference to Fig. 1 and the dotted line positions of the conveyor 37 at the retracted position of the trolley truss, it will be noted that the top of the tower is structurally designed to provide a portal providing clearance for the conveyor. This involves only engineering design consistent with the size and loads carried by the various parts.

The gathering mechanism at the base of the marine leg is shown in its simplest form in Fig. 2 (which is turned 180° from Fig. 1). As here shown, this mechanism comprises a rigid wedge-like nose piece 56 carried at the bottom of the leg and at one side thereof. Behind this is a short conveyor 57 that terminates near the roll 19, with a bridge plate being provided at 58. A toothed or spiked roller 59 is mounted forwardly of and slightly above the nose piece 56. Rearwardly of this roller is an endless chain unit 60 spaced above the conveyor 57, the chains having prongs or flights projecting therefrom. The rear or inner end of the chain unit is near the roll 17. As viewed in Fig. 2, the spiked wheel rotates in a counterclockwise direction and serves to dig, kick and shove material onto the nose piece 56. The conveyors 57 and 60 operate at a velocity to keep the material moving back at the desired speed and crowd it into the bight of the two converging belts. The material is then carried up between the belts, the yieldable guide rollers keeping the material between the belts while yielding to the irregularity of the load between them. The spring-pressed rollers yield more freely than the weight-counterbalanced ones, the latter preferably yielding to irregularities that might, without some yield, cause damage.

For the loads now contemplated, the marine leg might have two sets of opposed belts side by side, each belt being four feet wide and traveling at a lineal speed of around 400 feet per minute, but I have indicated only a single pair of belts. Two sets of belts, aside from simplifying some practical and engineering problems, would also permit of the use of oppositely turned gathering devices, one to the left as shown in Fig. 2, and one to the right, which would be a counterpart of the first.

The gathering means shown in Fig. 1 is identical with that shown in Fig. 2, except that in Fig. 1 the gathering device may rotate about the vertical axis of the marine leg. Here the gathering unit, designated 21, is housed in a structure 61 that includes a collar 62 rotatable about the cage or enclosure for the marine leg. The material is elevated to a circular conveyor 63 that discharges material onto a deflecting plate 64 from which it is removed between the two vertical belts. This gathering means can be moved around to any desired position on the marine leg when the leg is elevated and then lowered into the hold.

The arrangement shown in Fig. 3 shows the present preferred arrangement in which the bottom of the marine leg 12 has outwardly-flared plates 65. This outwardly-flared portion is below the rolls for the confronting conveyor belts, which rolls are here designated 66 and 67, and which, instead of one being located above the other, are in direct opposition with means such as springs or hydraulic cylinders 68 for resiliently urging the two rolls toward each other. Two similar opposed frames 69 are hung from the bottom of the marine leg to swing about the axes of the rollers 66 and 67 through a limited vertical arc. Each of the side plates 69 constitutes a frame supporting a unit having three rollers arranged in triangular relation, these rollers being designated 70, 71 and 72. An endless chain 73 passes around these three rollers which may conveniently be in the form of sprockets, each chain having a series of projecting flights or digging elements thereon. Yieldable means in the form of springs or fluid pressure cylinders 74 operate on the frames 69 to yieldably urge them toward each other, but in Fig. 3 the left-hand unit is shown in a position where it is swung back from the right-hand unit. These two systems of rollers and chains are driven by a motor (not shown) in a direction such that the bottom reaches of each of the chains moves toward each other in a generally horizontal direction, and the vertical reaches which confront each other move upwardly together. Bridge plates are shown at 75 between the uppermost rollers or sprockets 72 and the respective rollers 66 and 67.

The action of the gathering units is to rake the material from each side of the leg toward the center of the leg and to yieldably confine the material between the upwardly-moving reaches of the chains. It is carried by these chains into the space between the two main conveyor belts in the marine leg which, as previously, are designated 14 and 15. The two gathering units are at such angles with relation to the marine leg that they can scrape along the floor of the cargo hold in the final cleanup operation, and they will also operate effectively at the top of a pile of material. Because of the opposite flare, the unit can dig into the material at each side of the cargo hold which is covered by the overhanging deck of the ship.

In the operation of the apparatus generally the trolley truss is retracted and the marine leg may rest on the tower in the extreme right-hand position indicated in dotted lines in Fig. 1, which is the position in which it is located when not in use, or for the repair or replacement of parts. In this position it does not interfere with movement of ships alongside the dock. When a vessel has been moved alongside the dock for unloading and made fast, the tower is moved to a position to first remove material to the foremost compartment in the hold. It is projected out over the hatch and lowered through the hatch, after which the gathering mechanism is operated. The function of the gathering mechanism in addition to raking the material and leading it into the bight between the conveyor belts 14 and 15 is to break the material up into its original size. As the material is removed the marine leg is lowered. The material which is carried up between the belts is discharged at the top of the marine leg and is carried by the conveyor 37 into the hopper or chute 41. From thence it is discharged onto the short conveyor 43 and from this conveyor is delivered in the manner described through the chute 46 onto the conveyor 47 fixed in the tower. As the material is removed from the hold the trolley truss is pulled toward the dock. The conveyor 43 moves with the trolley truss and the chute 46 moves along the belt 47 so that in the digging positions the material always discharges onto the belt 47. As the marine leg lowers the conveyor 37 moves from the dotted line position shown in Fig. 1 down to the full-line position where it is horizontal. This movement is accommodated by the trolley arrangement 41 and the belt 43.

The operation of removing the material from the compartment is continuous until it is empty, after which the marine leg is withdrawn and the tower moved to repeat the operation in the next compartment. All controls for the apparatus are in a control cab 76 at the outer end of the trolley truss. As before explained, the counterweight 34 operates continuously to prevent the accumulation of any slack in the marine leg raising and lowering cable 22 so that the full weight of the marine leg cannot come to bear on the bottom plate of the ship's hold.

Since the individual components of the apparatus are to a large extent known and used in other environments, and since the structural details involve only the usual engineering skill, and since the invention resides in the organization of the parts rather than in the novelty of individual features, the schematic drawings are used to illustrate the invention, and various modifications and changes in the construction may be made within the contemplation of my invention and under the scope of the following claims.

I claim:

1. Material handling apparatus comprising a tower, a rigid trolley truss in the tower movable horizontally from a retracted to an extended position, a marine leg comprising a vertical conveyor on the trolley truss mounted for movement up and down on the truss, means for receiving material from the marine leg and transferring it to receiving means on the tower, means for raising and lowering the leg relative to the trolley truss, said means including a fall and cable, a carriage mounted on the truss movable longitudinally thereof, a hoisting drum on the carriage on which said cable is wound whereby tension on the cable tends to move the carriage along the trolley truss, means for limiting the movement of the carriage in the direction of the pull exerted by the cable, and a counterweight attached to the carriage and effective to exert a tension tending to move the carriage in a direction opposite the direction of the pull of the cable.

2. Material handling apparatus for unloading bulk material from vessels comprising a supporting tower, a trolley truss supported in the tower for movement horizontally from a retracted to an extended position, a vertical marine leg in the outer end of the trolley truss having its upper end extending above the trolley truss and its lower end projecting below the truss and movable vertically in a plane, means for raising and lowering the marine leg, said marine leg having conveyor means for elevating loose material to the top of the leg, a chute at the top of the leg into which material is discharged, a transfer belt conveyor on the boom having its forward end pivotally attached to the marine leg under the chute to receive material from the chute, the rear end of the transfer belt conveyor being slidably pivoted on the boom for angular movement and movement along the boom, a relatively fixed belt conveyor in the trolley truss below the transfer conveyor having its upper reach extending under the slidably and pivotally supported inner end of the transfer conveyor to receive material from the transfer conveyor in any position and angle of the transfer conveyor, a receiving chute fixed adjacent one end of the last-named conveyor for receiving material therefrom, a third conveyor on the trolley truss relatively fixed with reference to the chute for receiving material from the chute, another chute into which the third conveyor discharges, and a reversible conveyor in the tower below the trolley truss over which the end of the last-named chute of the trolley truss travels as the truss is moved horizontally and onto which the said chute delivers material, and a discharge chute at each end of said last-named conveyor.

References Cited in the file of this patent

UNITED STATES PATENTS

| | | |
|---|---|---|
| 469,175 | Schutte et al. | Feb. 16, 1892 |
| 619,463 | Bartlett et al. | Feb. 14, 1899 |
| 676,075 | McDougall | June 11, 1901 |
| 984,706 | Ray | Feb. 21, 1911 |
| 1,441,249 | Smith | Jan. 9, 1923 |
| 1,446,985 | Nelson | Feb. 27, 1923 |
| 1,991,652 | Bean | Feb. 19, 1935 |
| 2,601,558 | Redler | June 24, 1952 |
| 2,805,762 | Kampfer | Sept. 10, 1957 |

FOREIGN PATENTS

| | | |
|---|---|---|
| 341,023 | Great Britain | Jan. 5, 1931 |
| 431,146 | Italy | Feb. 25, 1948 |